Feb. 1, 1944.　　　　F. R. DEURING　　　　2,340,513
ARRANGEMENT OF THE TRANSVERSE-SUPPORTS IN
AUTOMATIC AND SEMI-AUTOMATIC LATHES
Filed April 24, 1941

Fritz Richard Deuring
Inventor
by Knight
Atty.

Patented Feb. 1, 1944

2,340,513

UNITED STATES PATENT OFFICE 2,340,513

ARRANGEMENT OF THE TRANSVERSE SUPPORTS IN AUTOMATIC AND SEMIAUTOMATIC LATHES

Fritz Richard Deuring, Gladbach-Rheydt, Germany; vested in the Alien Property Custodian Application April 24, 1941, Serial No. 390,058
In Germany June 6, 1940

1 Claim. (Cl. 82—24)

In the well known automatic and semi-automatic lathes the transverse supports are moved automatically only transversely to the longitudinal axis of the lathes, whereas in the direction parallel to the longitudinal axis they are only adjustable, which means, that they can be adjusted only before the beginning of an operation and must be fixed by screwing home. The adjusting in the longitudinal direction was comparatively complicated and required much time and work.

The invention is based on the knowledge, that a considerable improvement can be attained if, besides the movement transversely to the axis of the lathe, the transverse support or supports can further carry out automatically a movement in the longitudinal direction of the lathe. The whole arrangement is thus not only considerably simplified, but the reliability is increased and an essential increase of the efficiency and of the working range is also attained, in that by combination of the two kinds of movement of the transverse supports works can be treated, the treatment of which was up to the present not possible in automatic or semi-automatic lathes or required special arrangements.

Flowing pressure media are preferably employed for the two working movements of the transverse support or of the transverse supports, said pressure media being adapted to be controlled in a known manner by the movement itself. The carriage is then constructed as an undivided machine element comprising two cylinders, the axes of said cylinders extending perpendicularly the one to the other, one of the cylinders cooperating with a stationary piston effecting the shifting along the lathe, whereas the other cylinder serves for guiding the tool-carrier and carries centrally a stationary piston, which cooperating with the tool-carrier constructed as cylinder produces the transverse movement.

Figure 1:
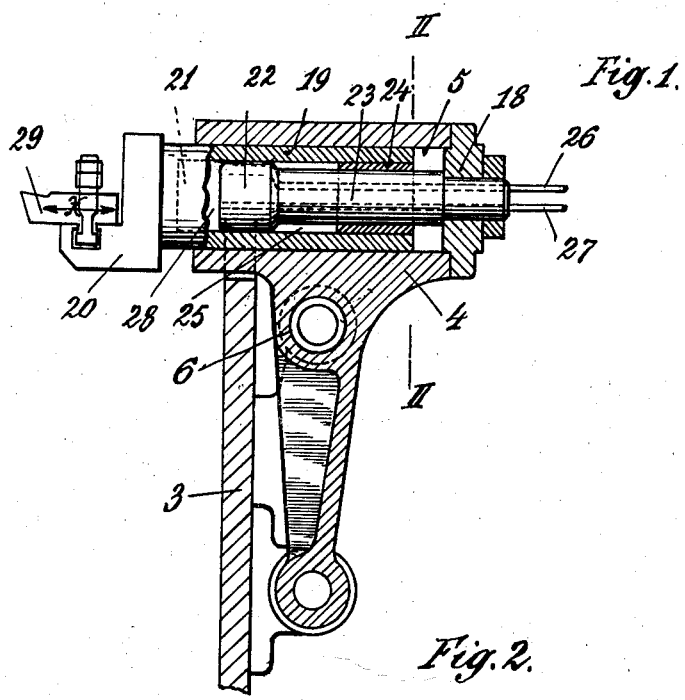

An embodiment of the invention is illustrated by way of example in the accompanying drawing, in which:

Fig. 1 shows a vertical section transversely to the axis of the lathe, and

Figure 2:
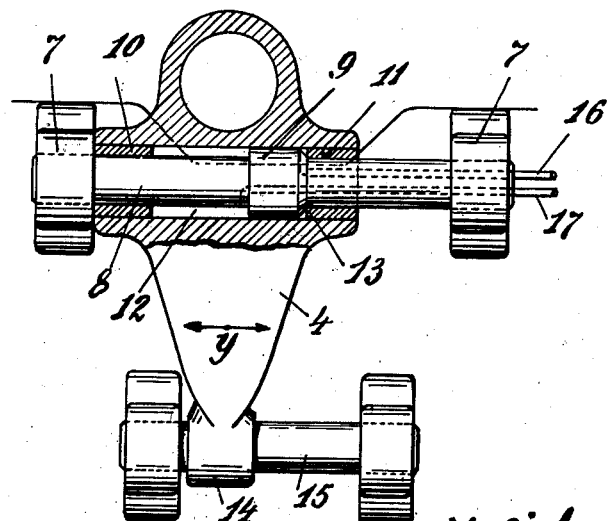

Fig. 2 a section on line II—II of Fig. 1 viewed from the right.

On the lathe 3 the carriage 4 is arranged so that it can be shifted parallel to the lathe, the carriage having in its top portion a transverse cylindrical bore 5 and under the same a cylindrical bore 6 which extends parallel to the lathe. On the lathe 3 a piston rod 8 is journalled in bearings 7 and carries a piston 9 fitting into the cylindrical bore 6. Bushes 10 and 11 serve as guides and for shutting off the pressure spaces 12 and 13 in front of and behind the piston 9. The carriage 4 has a downwardly directed extension 14 which is guided on a rod 15 fixed in the lathe 3. A conduit 16 extends through the piston rod 8 towards the pressure chamber 13, and a conduit 17 to the pressure space 12. In the transversely located cylindrical bore 14, which is closed by a cylinder cover 18 on the one side, an extension 19 of the tool-carrier 20 moves piston-like and ensured against rotation by any arrangement, not shown in the drawing. This piston-like extension 19 has a cylindrical bore 21 in which a piston 22 fits which is fixed on a piston rod 23 fixed in the cover 18. A bush 24 serves as guide and for limiting the pressure chamber 25 between itself and the piston 22. A conduit 26 leads to this pressure chamber 25, whereas a second conduit 27 leads to the pressure chamber 28 located in front of the piston. The pressure conduits 16, 17 and 26, 27 are connected with the sockets of the pressure pump in usual manner by hoses or pipes with joints.

The operation with the aid of the new support takes place automatically in the rhythm of the turning work in that, for instance, the carriage 4 carries out first a movement along lathe 3 in the direction of the arrow y and thereby introduces the tool 29 into a plate-shaped work or into a bore. If this has been done, this movement of the carriage is stopped, and then the movement transversely to the axis of the lathe takes place in that the pressure medium is admitted into the space 28, and the tool carrier 20 together with the tool is shifted towards the left (Fig. 1) in the direction of the arrow x. If the work has been treated, the movement proceedings are repeated in inverse succession. The reversing can be attained thereby that, by pressure increase produced when the tool carrier has attained the preliminarily adjusted end position and for instance strikes against an abutment, a control valve is reversed. The tool carrier 20 then carries out first a movement in the direction of the arrow x towards the right (Fig. 1), whereas, as soon as this movement is terminated, the carriage 4 carries out a movement towards the right in the direction of the arrow y. In this manner works of disc-shape or pot-shape can be turned cylindrically on the inner side as well as plane on the bottom faces which are situated deeper.

What I claim as my invention and desire to secure by Letters Patent of the United States is:

In an automatic or semi-automatic lathe, a bed, a cross slide mounted on said bed and comprising an integral unitary body having two cylinders therein at right angles to each other, a tool holder having a cylindrically bored piston-like extension slidably guided in one of said cylinders, a piston guided in the bore of said extension and fixed to said unitary body, means for supplying a fluid pressure medium to the bore of said extension on either side of said piston, a second piston in the other of said cylinders rigidly connected to said bed, said unitary body being adapted to reciprocate on said second piston, and means for supplying a fluid pressure medium to said other cylinder at either side of said second piston to reciprocate said unitary body.

FRITZ RICHARD DEURING.